United States Patent [19]
Lew et al.

[11] Patent Number: 5,602,344
[45] Date of Patent: Feb. 11, 1997

[54] INERTIA FORCE FLOWMETER

[76] Inventors: Hyok S. Lew; Yon S. Lew, both of 7890 Oak St., Arvada, Colo. 80005

[21] Appl. No.: 299,362

[22] Filed: Sep. 1, 1994

[51] Int. Cl.⁶ ........................................................ G01F 1/84
[52] U.S. Cl. ........................................................ 73/861.356
[58] Field of Search .......................... 73/861.38, 861.37, 73/861.42, 461.44

[56] References Cited

U.S. PATENT DOCUMENTS

| | | | |
|---|---|---|---|
| 4,829,832 | 5/1989 | Lew | 73/861.38 |
| 5,184,518 | 2/1993 | Lew | 73/861.38 |
| 5,295,398 | 3/1994 | Lew | 73/861.38 |
| 5,425,277 | 6/1995 | Lew | 73/861.38 |
| 5,485,755 | 1/1996 | Lew | 73/861.38 |
| 5,501,106 | 3/1996 | Lew et al. | 73/861.38 |

OTHER PUBLICATIONS

Inertia Force Flow meter with separate fluid vibrator and inertia –08/357586, Hyok S. Lew filed Dec. 16, 1994.

*Primary Examiner*—Richard Chilcot
*Assistant Examiner*—Jewel V. Artis

[57] ABSTRACT

A inertia force flowmeter comprises a conduit under a lateral reciprocating motion in directions perpendicular to a reference plane defined by the center line of the conduit, and a pair of differential pressure sensors respectively measuring two fluctuating differential fluid pressures resulting from the lateral reciprocating motion of the conduit at two different sections of the conduit, and a motion sensor detecting an amplitude of the reciprocating velocity of the lateral reciprocating motion of the conduit, wherein the mass flow rate of fluid media moving through the conduit is determined from a product of the ratio of the amplitude of the fluctuating differential pressure to the amplitude of the lateral reciprocating velocity of the conduit and a function of the phase angle difference between the two fluctuating differential fluid pressures.

20 Claims, 4 Drawing Sheets

INERTIA FORCE FLOWMETER

FIELD OF INVENTION

This invention relates to a flowmeter comprising a conduit under a reciprocating motion in directions perpendicular to the flow direction of the fluid moving through the conduit, a pair of differential pressure sensors respectively measuring two fluctuating fluid pressures resulting from the reciprocating motion of the conduit respectively at two different sections of the conduit, and a velocity sensor measuring the oscillating velocity of the reciprocating motion of the conduit, wherein the mass flow rate of fluid moving through the conduit is determined as a product of a function of a phase angle difference between the two fluctuating fluid pressures and a ratio of the amplitude of fluctuation in the fluid pressure to the amplitude of the oscillating velocity of the conduit, and the volume flow rate is determined as a product of another function of the phase angle difference between the two fluctuating fluid pressures and the amplitude of the oscillating velocity of the conduit.

BACKGROUND OF INVENTION

Without any exceptions, all of the existing versions of the Coriolis force flowmeter or the convective inertia force flowmeter employ a combination of one or a pair of conduits under a flexural vibration and two vibration sensors respectively detecting the flexural vibration of the conduit at two different sections of the conduit, wherein the mass flow rate of fluid media moving through the conduit is determined as a product of a constant and a function of a phase angle difference (or other variable related to the phase angle difference). In the present day practice, the numerical value of the above-mentioned constant of proportionality relating the phase angle difference to the mass flow rate of media is determined by calibrating the flowmeter, which numerical value or the product of the numerical value and the frequency of the flexural vibration of the conduit is then treated as a constant number in the operation of the flowmeter. As to be shown by the description of the operating principles of the present invention, the above-mentioned constant of proportionality is not a physical constant, but it is a physical variable having a numerical value that is a function of the dynamic parameters characterizing the flexural vibration of the conduit filled with fluid. By flexurally vibrating the conduit filled with the fluid media at a natural frequency thereof in the operation of the flowmeter, the numerical value of the above-mentioned constant of proportionality can be kept at a constant value as long as the dynamic parameters of the vibrating system such as the amplitude and frequency of the flexural vibration, density of the fluid media, bending stiffness of the conduit, etc. do not experience a significant change due to the changing working environment and varying property of the fluid media. Otherwise, the existing versions of the Coriolis force flowmeters fail to measure the mass flow rate of fluid media with an accuracy meeting the standard set by the calibration of the flowmeter. It will become clear as the derivation and description of the operating principles of the present invention progresses that the existing versions of the Coriolis force flowmeters are operated on a theoretical foundation satisfying the principles of dynamics in a less than rigorous manner and, consequently, they lack the self-calibrating ability required to maintain the accuracy in the mass flow measurement at the level set by the initial calibration of the flowmeter independent of the changing conditions in the property of fluid media and the working environment. Another short-coming of the existing versions of the Coriolis force flowmeters is their vulnerability to ambient mechanical vibrations and their inability to measure the mass flow rate of media having low values of density such as gaseous media, which short-coming results from the fact that, in the present day practice of the operation of the convective inertia force or Coriolis force flowmeter, the convective inertia force experienced by the media and providing the measure of mass flow rate of the media is measured by measuring the effect thereof on the flexural vibration of the conduit (the phase angle difference between the flexural vibrations of two opposite halves of the conduit) rather than measuring directly the convective inertia force experienced by the fluid media. The present invention teaches a new method for measuring directly the convective inertia force experienced by the fluid media and determining the mass flow rate of fluid media from the directly measured value of the convective inertia force experienced by the fluid media, and provides a new inertia force mass flowmeter calibrating itself on a real time basis and capable of measuring mass flow rate of liquid media as well as gaseous media, which new inertia force mass flowmeter can be constructed in all sizes varying from a very small size to a very large size.

BRIEF SUMMARY OF INVENTION

The primary object of the present invention is to provide an inertia force or convective inertia force flowmeter comprising at least one rigid or elastic conduit under a reciprocating motion in directions perpendicular to the flow direction of fluid moving through the conduit; and a plurality of measuring devices measuring the convective inertia force experienced by the fluid at two different sections of the conduit, and measuring the amplitude of the fluid pressure fluctuation resulting from the reciprocating motion of the conduit and/or the amplitude of oscillatory velocity of the reciprocating motion of the conduit, wherein the mass flow rate of fluid is determined from a mathematical combination of the phase angle difference between two alternating convective inertia forces experienced by the fluid respectively at the two different sections of the conduit, and the amplitude of the fluid pressure fluctuation and/or the amplitude of the oscillating conduit velocity.

Another object is to provide the inertia force flowmeter described in the afore-mentioned primary object of the invention, wherein the devices measuring the convective inertia force at two different sections of the conduit comprises one or a pair of differential pressure sensors.

A further object is to provide the inertia force flowmeter described in the primary object of the invention, wherein the devices measuring the convective inertia force at two different sections of the conduit comprises two vibration sensors.

Yet another object is to provide the inertia force flowmeter described in the primary object of the invention, wherein the reciprocating motion of the conduit is created by an electromagnetic vibrator.

Yet a further object is to provide the inertia force flowmeter described in the primary object of the invention, wherein the reciprocating motion of the conduit is created by a rotating machine equipped with a crank shaft and a connecting rod.

Still another object is to provide an inertia force mass flowmeter comprising a rigid conduit with an enlarged section containing a rotary member under an oscillatory torsional motion about the center line of the conduit, which rotary member divides the flow passage provided by the rigid conduit into a plurality of sub-passages disposed about the center line of the conduit, wherein the inertia force flowmeter further comprises a plurality of measuring devices measuring the convective inertia force experienced by the fluid at two different sections of the sub-passage, and measuring the amplitude of the fluid pressure fluctuation resulting from the oscillatory torsional motion and/or the amplitude of the oscillatory torsional motion of the rotary member, wherein the mass flow rate of fluid moving through the conduit is determined from a mathematical combination of the phase angle difference between the two alternating convective inertia forces experienced by the fluid at two different sections of a sub-passage, and the amplitude of the fluid pressure fluctuation and/or the amplitude of the oscillatory torsional velocity of the rotary member.

Still a further object is to provide a volume flowmeter having the conduit construction employed in the mass flowmeter described in the afore-mentioned primary or still another object of the present invention, and comprising a plurality of measuring devices measuring the convective inertia force experienced by the fluid at two different sections of the flow passage or sub-passage and measuring the amplitude of the oscillatory velocity of the reciprocating motion of the conduit or the amplitude of the oscillatory torsional motion of the rotary member, wherein the volume flow rate is determined from a mathematical combination of the phase angle difference between two alternating convective inertia forces experienced by the fluid respectively at two different sections of the conduit or sub-passage and the amplitude of the oscillating conduit velocity or amplitude of the oscillatory torsional velocity of the rotary member.

These and other objects of the present invention will become clear as the description of the invention progresses.

BRIEF DESCRIPTION OF FIGURES

The present invention may be described with a greater clarity and specificity by referring to the following figures.

DESCRIPTION OF OPERATING PRINCIPLES

The equation of motion governing the motion of fluid moving through a conduit under a reciprocating motion in directions perpendicular to the flow direction of fluid moving through the conduit, can be written in the form $$\rho \frac{\partial v}{\partial t} + \rho U \frac{\partial v}{\partial x} = -\frac{\partial p}{\partial y}, \tag{1}$$

where $\rho$ is the fluid density, v is the velocity of reciprocating motion of the conduit in directions perpendicular to the fluid velocity U moving through the conduit, t is the time, x is the distance measured along the center line of the conduit from the midsection of the conduit, p is the fluid pressure, and y is the distance measured in the direction of the reciprocating motion of the conduit from the center line of the conduit. When equation (1) is integrated over the diameter of the conduit, it takes the following form:

$$\rho A \frac{\partial v}{\partial t} + M \frac{\partial v}{\partial x} = -\frac{\pi D}{4} \Delta p, \tag{2}$$

where A is the cross sectional area of the flow passage provided by the conduit, M is the mass flow rate of fluid moving through the conduit, D is the diameter of the flow passage provided by the conduit, and $\Delta$ is the differential value of the fluid pressure across the diameter of the conduit diametrically extending across a cross section of the conduit in a direction parallel to the direction of the reciprocating motion of the conduit. The velocity U of the reciprocating motion of the conduit and the differential pressure $\Delta p$ satisfying equation (2) can be expressed in the following forms of series expansions:

$$v(x,t) = v_0(x,t) + \left(\frac{V_C}{\omega L}\right) v_1(x,t) + \left(\frac{V_C}{\omega L}\right)^2 v_2(x,t) + \ldots, \tag{3}$$

and $$\Delta p(x,t) = \Delta p_0(x,t) + \left(\frac{V_C}{\omega L}\right) \Delta p_1(x,t) + \left(\frac{V_C}{\omega L}\right)^2 \Delta p_2(x,t) + \ldots. \tag{4}$$

where $V_C$ is the amplitude of $v_0(x,t)$ measured at the center section of the conduit, and L is one half of the length of the conduit secured at the two opposite extremities. Substitution of equations (3) and (4) into equation (2), and equating the terms of the same power of $(V_C/\omega L)$ to each other yields equations $$\rho A \frac{\partial v_0}{\partial t} = -\frac{\pi D}{4} \Delta p_0, \tag{5}$$

$$\rho A \frac{\partial v_1}{\partial t} + M \frac{\partial v_0}{\partial x} = -\frac{\pi D}{4} \Delta p_1, \tag{6}$$

$$\rho A \frac{\partial v_2}{\partial t} + M \frac{\partial v_1}{\partial x} = -\frac{\pi D}{4} \Delta p_2, \tag{7}$$

Let us consider a case wherein an electromagnetic vibrator or a motor equipped with a crank shaft and a connecting rod or with a cam generates a reciprocating motion of the conduit in the following mode:

$$v_0(x,t) = V_0(x) \sin \omega t, \tag{8}$$

where $V_0$ and $\omega$ are respectively the amplitude and the circular frequency of the reciprocating velocity of the conduit. Substitution of equation (8) into equations (5) and (6) yields equations $$\Delta p_0 = -\frac{4\omega\rho A V_0(x)}{\pi D} \cos\omega t, \tag{9}$$

and $$\Delta p_1 = -\frac{4}{\pi D} \left[ \rho A \frac{\partial v_1}{\partial t} + M \frac{dV_0(x)}{dt} \sin\omega t \right]. \tag{10}$$

The solution of equation (10) can be found in the following form $$v_1 = \frac{V_1(x)}{EI} \cos\omega t, \tag{11}$$

and $$\Delta p_1 = -\frac{4}{\pi D} \left[ M \frac{dV_0(x)}{dx} \sin\omega t - \frac{\omega\rho A V_1(x)}{EI} \right], \tag{12}$$

where E is the modulus of elasticity of the material making up the conduit wall and I is the moment of inertia of the cross sectional area of the conduit. Substitution of equations (10) and (12) into equation (4) yields the following equation for the differential value of the fluid pressure:

$$\Delta p = -\frac{4}{\pi D} \left\{ \omega\rho A V_0(x)\cos\omega t + \frac{V_C}{\omega L} \left[ M \frac{dV_0(x)}{dx} - \frac{\omega\rho A V_1(x)}{EI} \right] \sin\omega t \right\}. \tag{13}$$

Figure 1:
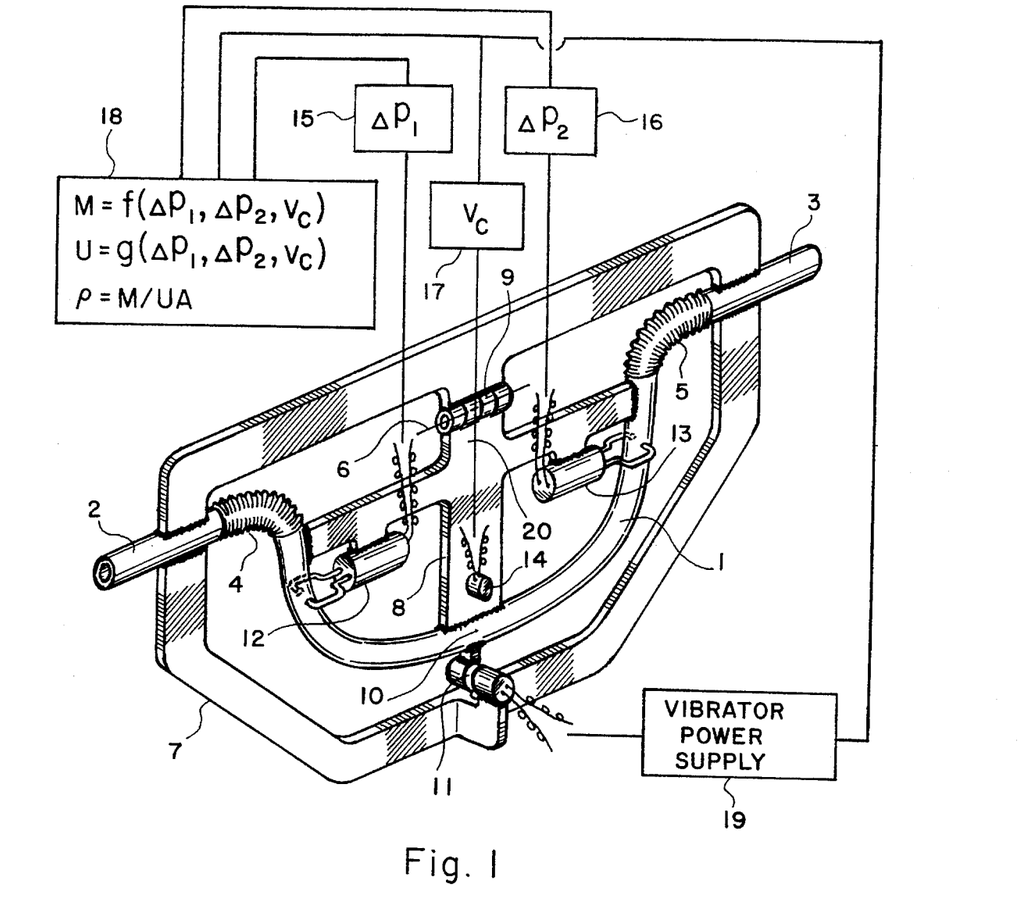
FIG. 1 illustrates an embodiment of the inertia force flowmeter of the present invention comprising a single curved conduit.

When the conduit has a high stiffness and a curved geometry, and is pivotally vibrated about the plane defined by the center line of the conduit as shown in FIG. 1 of the patent drawings, equation (13) can be approximated by equation $$\Delta p = -\frac{4}{\pi D} \left[ \omega\rho A V_0(x)\cos\omega t + \frac{V_C M}{\omega L} \frac{dV_0(x)}{dx} \sin\omega t \right]. \tag{14}$$

Equation (14) can be written in the form $$\Delta p = -\Delta P(x) \cos[\omega t - \phi(x)], \tag{15}$$

where $$\phi(x) = \tan^{-1}\left[ \frac{V_C M}{\omega^2 \rho L A V_0(x)} \frac{dV_0(x)}{dx} \right], \tag{16}$$

and $$\Delta p(x) = \frac{4\omega\rho A V_0(x)}{\pi D \sqrt{1 - \left[ \frac{V_C}{\omega^2 \rho L A V_0(x)} \cdot \frac{V_C M}{2\omega L} \cdot \frac{dV_0(x)}{dx} \right]^2}}. \tag{17}$$

Equation (16) provides the following relationship between the mass flow rate M and the phase angle $\phi(x)$:

$$M = \frac{\omega^2 \rho L A V_0(x)}{V_C \frac{dV_0(x)}{dx}} \tan\phi(x). \tag{18}$$

When the conduit has a geometry symmetric about the center plane perpendicularly intersecting with the center section of the conduit and pivotally vibrated in a symmetric mode about the center plane as shown in FIG. 1 of the patent drawing, equations (17) and (18) can be combined to obtain equation $$M = \frac{\pi\omega DL\Delta P(0)}{4V_C \frac{dV_0(x)}{dx}} \tan\phi(x), \tag{19}$$

where $\Delta P(0)$ is the amplitude of the differential pressure fluctuation measured at the center section of the conduit, and $V_C$ is the amplitude of the reciprocating velocity of the conduit measured at the center section of the conduit. When use of the subtraction formula of the tangent function is made, equation (19) can be written in the form $$M = \frac{\pi\omega DL\Delta P(0)}{4V_C S(b)} \tan(\Delta\phi), \tag{20}$$

where S(b) is the slope of the curved conduit at a section x=b measured with respect to a line tangent to the center section of the conduit, and $\Delta\phi$ is the phase angle difference between two fluctuating differential pressures respectively measured at two sections of the conduit x=±b located symmetrically about the center plane. Equation (20) can be written in the form $$M = K \frac{\Delta P(0)}{V_C} \tan(\Delta_2\phi), \tag{21}$$

where K is a constant defined by $$K = \frac{\pi\omega DL}{4S(b)}. \tag{22}$$

According to equation (21), the mass flow rate of fluid moving through a curved conduit under a reciprocating motion in directions perpendicular to a plane defined by the center line of the conduit is proportional to the product of a ratio of the amplitude of the differential pressure fluctuation measured at the center section of the conduit to the amplitude of the reciprocating velocity of the conduit measured at the center section of the conduit and the tangent of the phase angle difference between two oscillating differential pressures respectively measured at two different sections of the conduit located symmetrically about the center plane. Equation (21) may be approximated by equation $$M = K_1 \frac{\Delta P}{V} \tan(\Delta_2\phi), \tag{23}$$

where $\Delta P$ and V are respectively the amplitude of the differential pressure fluctuation and the amplitude of the reciprocating velocity of the conduit measured at any selected section of the conduit. In using equation (21) or (23) in determining the mass flow rate of fluid, the constant of proportionality K and $K_1$ should be determined empirically by calibrating the flowmeter, and tan ($\Delta\phi$) may be approximated by $\Delta\phi$ when the phase angle difference $\Delta\phi$ is less than five degrees. The amplitude $\phi P$ of the differential pressure fluctuation measured at one section of the conduit may be replaced with a mean value of two values thereof respectively measured at two different sections of the conduit. Likewise, the amplitude V of the reciprocating velocity of the conduit measured at one section of the conduit can be replaced with a mean value of two values thereof respectively measured at two different section of the conduit. Equation (18) can be used to obtain the following equation defining the relationship between the fluid velocity U and the phase angle difference:

$$U = C \frac{\omega^2}{V_C} \tan(\Delta_2\phi), \tag{24}$$

or $$U = C_1 \frac{\omega^2}{V} \tan(\Delta_2\phi), \tag{25}$$

where the constants of proportionality C and $C_1$ should be determined empirically by calibrating the flowmeter. When the lateral reciprocating motion of the conduit is generated by a driver such as the combination of a crank shaft and a connecting rod, or by a combination of a cam and a cam follower, the lateral reciprocating motion of the conduit has a fixed amplitude and consequently, equations (23) and (25) can be written in the forms $$M = K_2 \omega \Delta P \tan(\Delta_2\phi), \quad (26)$$

and $$U = C_2 \omega^3 \tan(\Delta_2\phi). \quad (27)$$

If a constant average electric power is supplied to the electromagnetic vibrator generating the lateral reciprocating motion of the conduit, (V$\Delta$P) has a constant value and, consequently, equations (23) can be written in the forms $$M = K_3 \frac{1}{V^2} \tan(\Delta_2\phi). \quad (28)$$

While the mass flow rate of fluid is most accurately determined by measuring the amplitudes $\Delta P$ and V, and the phase angle difference $\Delta\phi$ and substituting them into equation (23), an economized version of the inertia force flowmeter may measure only the amplitude V of the reciprocating velocity of the conduit and the phase angle difference and determines the mass flow rate by substituting them into equation (28). In such an economized version of the inertia force flowmeter, it is very important to energize the electromagnetic vibrator with an alternating electric current having a constant amplitude. The inertia force flowmeter of the present invention determines the mass or volume flow rate of fluid by using one of equations (23) through (28).

The phase angle difference $\Delta\phi$ appearing in equation (23) through (28) can be determined as the phase angle difference between two alternating electrical signals representing the fluctuating differential pressure respectively occurring at two different sections of the conduit located symmetrically on two opposite sides of the center plane, which two alternating electrical signals are respectively proportional to equation (15) and, consequently, the following equations represent the fluctuating fluid pressures respectively at the two different sections of the conduit;

$$e(-b,t) = \alpha \Delta P(-b) \cos[\phi t - \phi(-b)], \quad (29)$$

and $$e(+b,t) = \beta \Delta P(+b) \cos[\omega t - \phi(+b)], \quad (30)$$

where $\alpha$ and $\beta$ are the amplification factor of the two transducers respectively converting the fluctuating differential pressures to the two alternating electrical signals. Of course, $\alpha = \beta$ when the two transducers respectively converting the two fluctuating differential pressures to the two alternating electrical signals are matched to one another. Usually, the two alternating electrical signals given by equations (29) and (30) are provided by a pair of differential pressure sensors respectively located symmetrically on two opposite sides of the center plane as shown in FIG. 1 of the patent drawings. One of the best known methods for obtaining the phase angle difference $\Delta\phi$ is to measure the time interval $\Delta T$ between the consecutive zero-crossings of the two alternating electrical signals and, then divide it by the period T of one of the two alternating electrical signals, e.g., $$\Delta\phi = 2\pi \frac{\Delta T}{T}. \quad (31)$$

Another method for obtaining the phase angle difference is to measure a first and second value of one of the two alternating electrical signals respectively at two different instants when the other of the two alternating electrical signals reaches a zero value and a peak value which first and second value of the first alternating electrical signal is related to the phase angle difference by equation $$\tan(\Delta\phi) = \frac{e(-b,t)\big|_{e(+b,t)=0}}{e(-b,t)\big|_{e(+b,t)=\text{PEAK}}}. \quad (32)$$

A further method for obtaining the phase angle difference is to form differential and additive combinations of the two alternating electrical signals and measure the amplitudes of the differential and additive combination of the two alternating electrical signals, and determine the phase angle difference by using the following equation:

$$\tan(\Delta_2\phi) = \frac{\text{Amp} \cdot [e(+b,t) - e(-b,t)]}{\text{Amp} \cdot [e(+b,t) + e(-b,t)]}. \quad (33)$$

wherein the two transducers or two differential pressure sensors respectively providing the two alternating electrical signals must be balanced to one another, or the two alternating electrical signals must be obtained in normalized forms. When the conduit is highly rigid as in the embodiments shown in FIGS. 1, 4, and 7 of the patent drawings, it is preferred to generate the two alternating electrical signals by using two differential pressure sensors respectively located on two opposite sides of the center plane, and determine the phase angle difference by using one of the above-presented three equations (31), (32) and (33). When the conduit has a high flexibility such as in the case of metallic tubing with a thin wall, which can be the case of any one of all the embodiments shown in the patent drawings, the two alternating electrical signals can be obtained by using two absolute or relative motion sensors respectively detecting the flexural vibrations of the two opposite halves of the conduit and used to determine the phase angle difference therebetween by using one of the three equations (31), (32) and (33). The rationale justifying the use of two motion sensors in place of the two differential pressure sensors is rather obvious, for a differential pressure produces a bending deflection of the conduit, which bending deflection with magnitude proportional to the magnitude of the differential pressure has a measurable magnitude when the conduit has a high flexibility. In the practice of the present invention, the two alternating electrical signals providing the information on the phase angle difference may be obtained by using a pair of differential pressure sensors in conjunction with any conduits as shown in the illustrative embodiments, or by using a pair of motion sensors in conjunction with conduits having high flexibility.

It becomes immediately clear from the above-presented operating principles of the present invention that, firstly, the present invention teaches much more precise formulas relating the phase angle difference between two convective inertia forces experienced by fluid respectively at two different sections of the conduit to the mass flow rate of fluid moving through the conduit, which formulas determine the mass flow rate of fluid much more accurately than the operating principles of the existing Coriolis force flowmeter and in a self-calibrating manner on a real-time basis, and secondly, the use of the pair of differential pressure sensors provides the two alternating electrical signals having a greater amplitude independent of the flexibility of the conduit providing the flow passage and, consequently, the present invention teaches the construction of a mass flowmeter employing a rigid or elastic conduit capable of measuring mass flow rate of very light-weight fluid exhibiting the inertia force effect of very small magnitude, which construction is perfectly suited for mass flowmeters of all sizes varying from a very small size to a very large size.

DESCRIPTION OF ILLUSTRATED EMBODIMENTS

In FIG. 1 there is illustrated a perspective view of an embodiment of the inertia force flowmeter comprising a single conduit, that is constructed and operating in accordance with the principles of the present invention. A curved conduit i having a geometry of a bow has an inlet leg 2 and outlet leg 3 connected thereto respectively by two couplings 4 and 5, which couplings such as flexible couplings, pivoting or rotary couplings facilitate a pivotal vibration of the conduit 1 about a pivot axis 6. When the couplings 4 and 5 are flexible couplings, the bowed or curved conduit 2 should be supported by a supporting structure 7 in a relationship allowing a pivotal movement of the curved conduit about the pivot axis parallel to the common center line of the inlet and outlet legs 2 and 3 of the conduit as exemplified by the particular illustrative embodiment, wherein the conduit 1 is rigidly secured to a reinforcing structure 8 that is pivotally supported by the supporting structure 7 by means of a hinge joint 9, which supporting structure also anchors the inlet and outlet legs 2 and 3 of the conduit. It should be understood that, in an alternative design, the combination of the bowed or curved conduit 1 and the inlet and outlet legs 2 and 3 may be constructed of a single continuous conduit having a thin wall wherein the reinforcing structure 8 can be omitted. It should be noticed that the combination of the bowed or curved conduit 1 and its supporting structure 8 has a planar construction parallel to a reference plane defined by the center line of the conduit 1, and is symmetric about the center plane perpendicular to the reference plane and perpendicularly intersecting the center section 10 of the bowed or curved conduit 1. A vibrator 11, which may be an electromagnet exerting a vibratory force onto the center section of the conduit 1 in directions perpendicular to the reference plane as exemplified by the particular illustrative embodiment, or a combination of a crank shaft and connecting rod or a cam and cam follower driven by a rotating machine in alternative designs, generates a pivotal vibration of the bowed or curved conduit 1 about the pivot axis 9 and produces a reciprocating motion of the bowed or curved conduit 1 in directions substantially perpendicular to the reference plane, wherein the magnitude of the reciprocating motion of the bowed or curved conduit 1 increases from zero value at its two extremities including the flexible or rotatable couplings 4 and 5 to a maximum value at the center section 10 in a symmetric distribution about the center plane. A first differential pressure sensor 12 detects the difference between two fluid pressures respectively existing in two regions respectively adjacent to two diametrically opposite portions of the wall of the bowed or curved conduit 1 at a first section of the bowed or curved conduit 1 located on one side of the center plane, which two diametrically opposite portions of the conduit wall are respectively located on two opposite sides of a plane defined by the center line of the bowed or curved conduit. A second differential pressure sensor 13 detects the above-defined differential pressure at a second section of the bowed or curved conduit 1 located on the other side of the center plane, wherein the first and second sections of the conduit, whereat the two differential pressures are tapped respectively, are located symmetrically about the center plane. A vibratory motion sensor 14 such as a piezo electric accelerometer or a magnetic induction coil sensor disposed on the center plane and anchored to the supporting structure 8 or directly to the bowed or curved conduit 1 measures the reciprocating velocity of the conduit.

The two differential pressure sensors 12 and 13 generate the two alternating electrical signals given by equations (29) and (30) respectively, while the vibratory motion sensor 14 generates an alternating electrical signal representing the reciprocating motion of the bowed or curved conduit 1 at the center section thereof. In determining the mass and/or volume flow rate of fluid media moving through the conduit 1 by using one of equations (21), (23), (24), (25), (26), (27), and (28), the phase angle difference $\Delta\phi$ is derived from the two alternating electrical signals provided by the two differential pressure sensors 12 and 13, while the amplitude $\Delta P$ of the fluctuating fluid pressure is derived from a mean value of the amplitudes of the two alternating electrical signals provided by the two differential pressure sensors 12 and 13. Of course, the amplitude $V_C$ of the reciprocating motion of the bowed or curved conduit 1 at its center section is derived from the alternating electrical signal provided by the vibratory motion sensor 14. The above-mentioned conversions from the alternating electrical signals to the physical variables are carried out respectively by the data analyzers 15, 16, and 17, which data analyzers supply the information required to determine the mass and/or volume flow rate of the fluid media to a data processor 18, that determines the mass flow rate of fluid media by using an empirical equivalent of one of equations (21), (23), (26) and (28) and determines the volume flow rate of fluid media by using an empirical equivalent of one of equations (24), (25) and (27). The data processor 18 may also determine the density of fluid media as a ratio of the mass flow rate to the volume flow rate.

Unlike the conventional method of operating the existing Coriolis force flowmeter wherein the conduit must be flexurally vibrated at one of its natural frequencies, the conduit employed in the inertia force of the present invention can be laterally reciprocated at any desired frequency, which may be or may not be a natural frequency of the combined structure of the conduit 1 and the supporting structure 8. In order to save electrical energy supplied to the vibrator 11, it may be preferrable to reciprocate or flexurally vibrate the bowed or curved conduit i about the pivot axis 6 at one of the natural frequencies, wherein the data processor 18 feeds the information on the natural frequency to the vibrator power supply 19 whereby the vibrator 11 exerts the vibratory force on the conduit at the natural frequency. It is immediately recognized that, in an alternative design, the pivotable hinge joint 9 may be omitted and the planar leg 20 of the reinforcing structure 8 may be anchored rigidly to the supporting structure 7. It is also noticed that, when the reinforcing structure 8 has a thin planar construction or the bowed or curved conduit 1 is a metallic tubing having a thin wall directly connected to the inlet and outlet legs 2 and 3, the combined structure of the bowed or curved conduit 1 and the reinforcing structure 8 or the continuous conduit structure without the reinforcing structure is provided with a torsional flexibility about an axis defined by the line of intersection between the reference plane and the center plane and, consequently, the pair of differential pressure sensors 12 and 13 can be replaced with a pair of vibratory motion sensors measuring the reciprocal motion of the conduit respectively at two locations symmetrically located about the center plane, which two vibratory motion sensors provide the two alternating electrical signals providing information on the phase angle difference, wherein the vibratory motion sensor 14 can be omitted as the amplitude V of the reciprocating motion of the conduit 1 can be obtained from a mean value of the amplitudes of the two alternating electrical signals respectively provided by the two vibratory motion sensors now replacing the two differential pressure sensors 12 and 13. In a design providing an ultra-accurate mass flowmeter, particular illustrative embodiment of the inertia force flowmeter may include an ultra-accurate differential pressure sensor measuring ΔP at the center section of the bowed or curved conduit 1, wherein the pair of differential pressure sensors 12 and 13, which can be of an inexpensive type, are used to generate the information on the phase angle difference only. It is readily recognized that, when the mass and/or volume flow rate of fluid media is, determined by one of equations (26), (27) and (28), the vibratory motion sensor 14 can be omitted from the particular illustrative embodiment as the frequency of the reciprocating motion of the conduit can be obtained from one of the two alternating electrical signals respectively generated by the two differential pressure sensors 12 and 13, or by one of the two vibratory motion sensors replacing the two differential pressure sensors 12 and 13.

Figure 2:
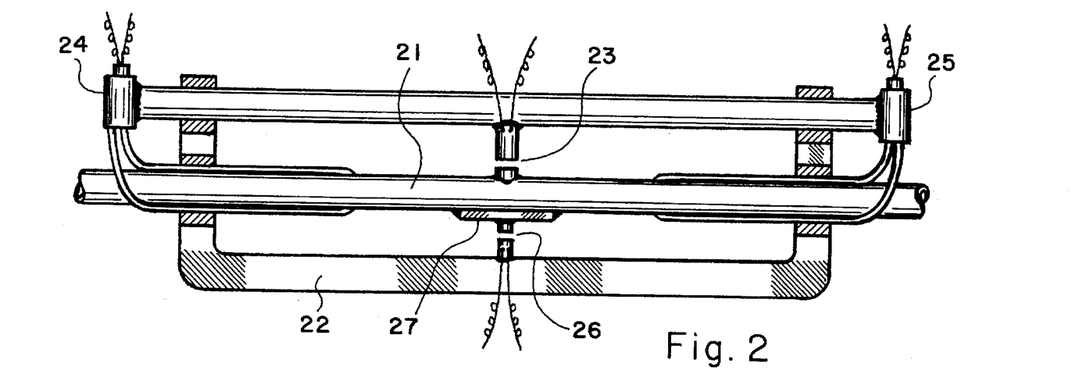
FIG. 2 illustrates another embodiment of the inertia force flowmeter comprising a single straight conduit.

In FIG. 2 there is illustrated another embodiment of the inertia force flowmeter having elements essentially the same as the elements included in the embodiment shown in FIG. 1 with one exception, that is the straight continuous conduit 21 secured to a supporting structure at the two opposite extremities of the conduit, which straight conduit 21 plays the same role as the bowed or curved conduit 1 included in the embodiment shown in FIG. 1. A vibrator 23 exerting a vibratory force onto the center section of the conduit 21 generates a flexural vibration of the conduit 21 in a symmetric mode about the center plane. A pair of differential pressure sensors 24 and 25 provide two alternating electrical signals providing the information on the phase angle difference as well as on the amplitude of the fluid pressure fluctuation. A vibratory motion sensor 26 provides the information on the amplitude of the flexural vibration of the conduit 21. Of course, the pair of differential pressure sensors 24 and 25 can be replaced by a pair of vibratory motion sensors. The electromagnetic shield plate 27 provides an electromagnetic shielding between the vibrator 23 and the motion sensor 26. This particular illustrative embodiment operates on the same principles as those described in conjunction with FIG. 1.

Figure 3:
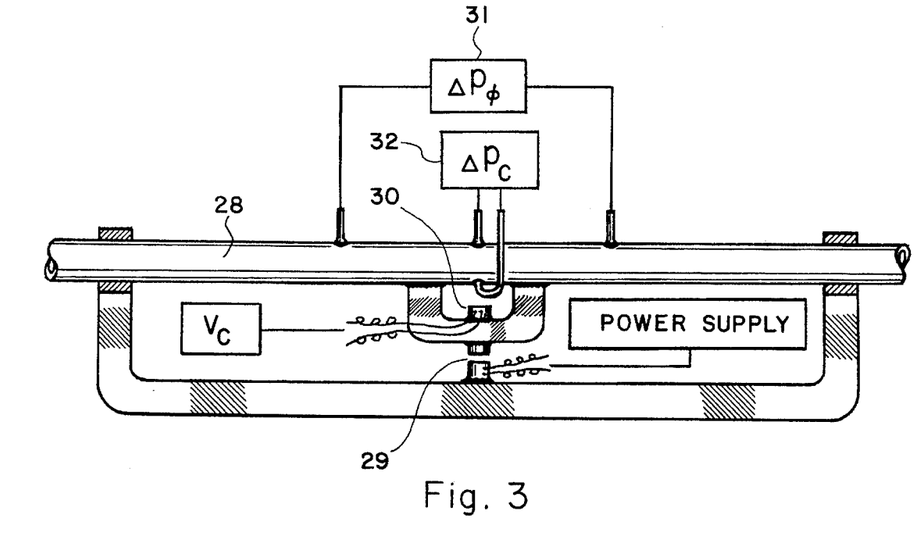
FIG. 3 illustrates a further embodiment of the inertia force flowmeter comprising a single straight conduit.

In FIG. 3 there is illustrated a further embodiment of the inertia force flowmeter, that comprises a conduit 28 under a flexural vibration generated by a vibrator 29, which flexural vibration is detected at the center section of the conduit by a vibratory motion sensor 30 of the accelerometer type. A first differential pressure sensing system 31 detects the vibratory component of differential value of the pressure between two fluid pressures respectively existing at two sections of the conduit 28 located symmetrically about the center plane, while a second differential pressure sensing system 32 detects the differential value of the pressure between two fluid pressures existing in regions adjacent to the wall of the conduit 28 and respectively at two diametrically opposite sides of the reference plane perpendicular to the direction of the vibratory motion of the conduit 28. The electrical signal generated by the differential pressure sensor 32 must be conditioned by a narrow band pass filter transmitting only an alternating electrical signal with frequencies equal or approximately equal to the frequency of the flexural vibration of the conduit 28. The phase angle difference between two convective inertia forces experienced by the fluid respectively at two sections of the conduit 28 located symmetrically about the center plane is determined as a ratio of the amplitude of a first alternating electrical signal generated by the first differential pressure sensing system 31 to the amplitude of a second alternating electrical signal generated by the second differential pressure sensing system 32 in accordance with the principles set forth by equation (33). The amplitude of the second alternating electrical signal generated by the second differential pressure sensing system 32 provides ΔPφ required in determining the mass flow rate of fluid media by using one of equations (21), (23) and (26). Of course, the amplitude V of reciprocating motion or flexural vibration of the conduit 28 is determined from an alternating electrical signal generated by the vibratory motion sensing system 30. This particular illustrative embodiment of the inertia force flowmeter determines the mass and/or volume flowmeter by using an empirical equivalent of one of equations (21), (23), (24), (25), (26), (27) and (28). It should be understood that the particular embodiment of the sensor systems respectively shown in FIGS. 1 and 3 are interchangeable and, consequently, different illustrative embodiments shown in FIGS. 1 through 9 of the patent drawings may employ either one of the two sensor systems respectively shown and described in conjunction with FIGS. 1 and 3.

Figure 4:
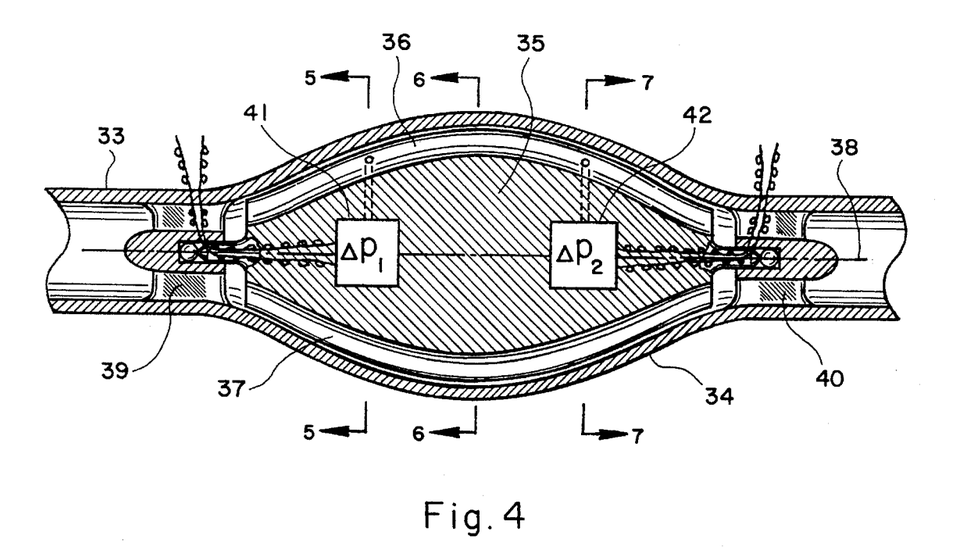
FIG. 4 illustrates a cross section of yet another embodiment of the inertia force flowmeter comprising a conduit with an enlarged section containing a rotary member dividing the flow passage into a plurality of sub-passages of fluid.

In FIG. 4 there is illustrated a cross section of yet another embodiment of the inertia force flowmeter. A rigid conduit 33 has an enlarged section 34 containing a rotary member 35 dividing the flow passage provided by the conduit 33 into a plurality of bowed or curved sub-passages 36, 37, etc. distributed axisymmetrically about the center line 38 of the conduit 33, wherein the rotary member 35 is supported by two pylon structures 39 and 40 in a relationship allowing at least a minute pivotal motion of the rotary member about a pivot axis coinciding with the center line 38 of the conduit 33. A pair of differential pressure sensors 41 and 42 included in the rotary member 35 detect the convective inertia forces experienced by the fluid media respectively at two different sections of one 36 of the plurality of bowed or curved sub-passages, which differential pressure sensors functions in the same manner as that of the pair of differential pressure sensors 12 and 13 included in the embodiment shown in FIG. 1.

Figure 5:
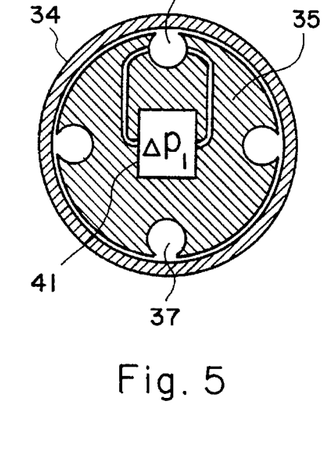
FIG. 5 illustrates another cross section of the inertia force flowmeter shown in FIG. 4.

In FIG. 5 there is illustrated another cross section of the inertia force flowmeter shown in FIG. 4, which cross section taken along plane 5—5 as shown in FIG. 4 shows the arrangement of the plurality of bowed or curved sub-passages 36, 37, etc. included in the rotary member 35, that is pivotally disposed within the enlarged section 34 of the conduit 33 in a close tolerance relationship, whereby the fluid media flows thereacross only through the plurality of bowed or curved sub-passages 36, 37, etc. It should be noticed that the differential pressure sensor 41 as well as 42 detects the differential value of the pressure across a particular diameter of the sub-passage 36, that is tangential to a cylindrical surface coaxial to the central axis of the rotary member 35. FIG. 5 also illustrates the cross section of the particular inertia force flowmeter taken along plane 7—7 as shown in FIG. 4, wherein the differential pressure sensor 41 now represents the differential pressure sensor 42.

Figure 6:
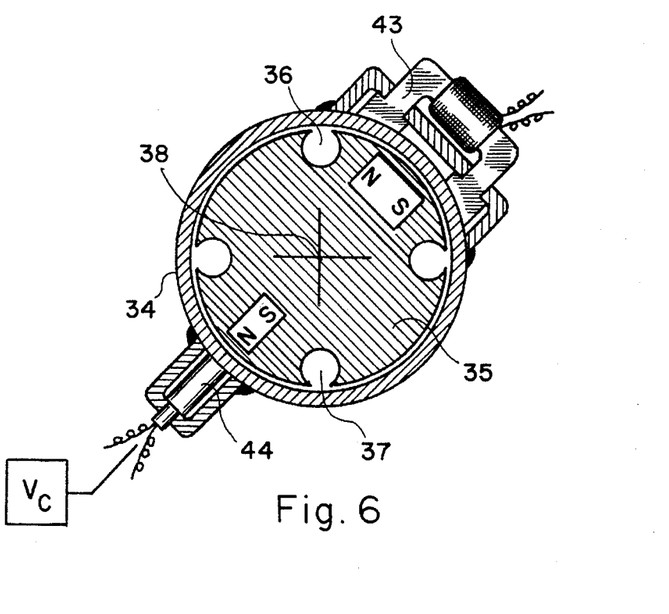
FIG. 6 illustrates a further cross section of the inertia force flowmeter shown in FIG. 4.

In FIG. 6 there is illustrated a further cross section of the inertia force flowmeter shown in FIG. 4, which cross section taken along plane 6—6 as shown in FIG. 4 shows the vibrator 43 comprising a permanent magnet embedded in the rotary member 35 and an electromagnet affixed to the wall of the enlarged section 34 of the conduit 33, that is energized by an alternating electric current, and a vibratory motion sensor 44 comprising a permanent magnet embedded in the rotary member 35 and a magnetic induction coil anchored to the wall of the enlarged section 34 of the conduit 33. In an alternative design, the vibratory motion sensor 44 may comprise a piezo electric type accelerometer embedded in the rotary member 35, that has lead wires extending therefrom routed through one of the two pylon structures 39 and 40 as exemplified by the routing of the lead wires extending from the differential pressure sensors 41 and 42 as shown in FIG. 4. The particular illustrative embodiment of the inertia force flowmeter employs the sensor systems essentially identical to those employed by the inertia force flowmeter shown in FIG. 1. In an alternative design, the sensor systems employed by the inertia force flowmeter shown in FIG. 3 may be employed.

Figure 7:
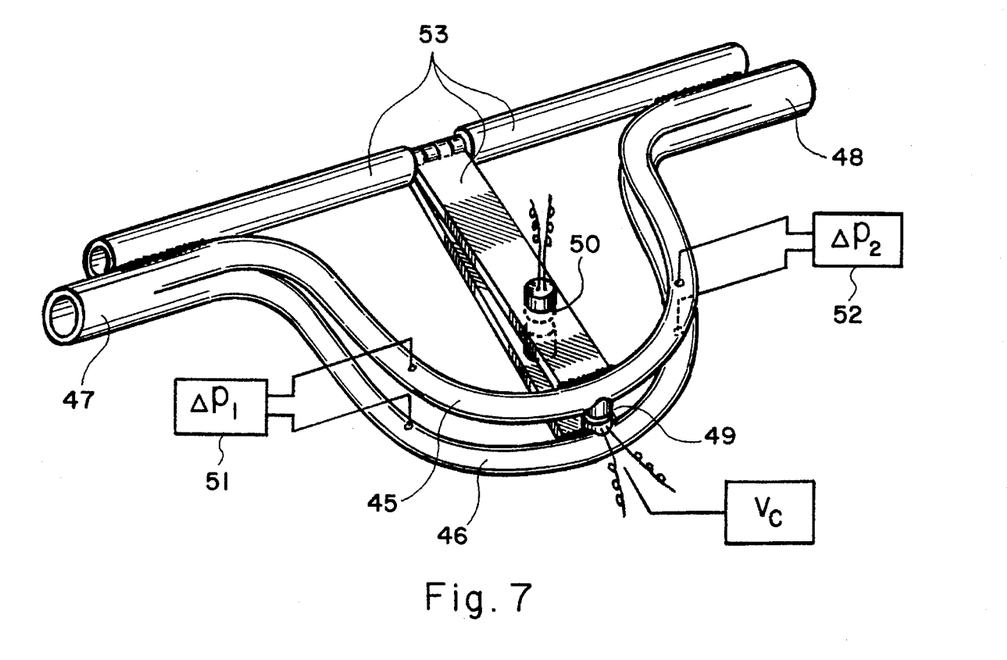
FIG. 7 illustrates yet a further embodiment of the inertia force flowmeter comprising a pair of curved conduits.

In FIG. 7 there is illustrated yet a further embodiment of the inertia force flowmeter of the present invention, which embodiment is a dual conduit version of the single conduit inertia force flowmeter shown in FIG. 1, that employs a pair of matched conduits 45 and 46 disposed in a superimposed relationship with a space therebetween, which pair of conduits 45 and 46 connects the common inlet leg 47 to the common outlet leg 48. A vibrator 49 exerts a vibratory force onto the center sections of the pair of conduits 45 and 46 in two opposite directions in an action-reaction relationship and generates a relative reciprocating motion or relative flexural vibration between the pair of bowed or curved conduits 45 and 46 in a direction perpendicular to a reference plane located intermediate two planes respectively defined by the center lines of the two bowed or curved conduits 45 and 46. A relative vibratory motion sensor 50 generates an alternating electrical signal representing the relative reciprocating motion between the two conduits 45 and 46 at the center plane. A pair of differential pressure sensors 51 and 52 disposed symmetrically about the center plane respectively generate two alternating electrical signals, wherein each of the pair of differential pressure sensors detects the difference between two fluid pressures existing in two fluid regions respectively adjacent to the farthest portion of the wall of the first bowed or curved conduit 45 from the reference plane located intermediate the pair of conduits 45 and 46, and to the nearest portion of the wall of the second bowed or curved conduit 46 to the reference plane. This dual conduit version of the inertia force flowmeter operates on the same methods as those described in conjunction with the single conduit version of the inertia force flowmeter shown in FIG. 1. It is readily recognized that the particular illustrative embodiment of the inertia force flowmeter functions without the reinforcing structure 53 supporting the pair of bowed or curved conduits 45 and 46 in a pivotable arrangement, when the two halves of the vibratory motion sensor 50 are relocated and directly affixed respectively to the center sections of the pair of conduits 45 and 46. It is also noticed that the two opposite extremities of each of the pair of bowed or curved conduits 45 and 46 may include the flexible or pivotable couplings such as the flex-couplings 4 and 5 included in the embodiment shown in FIG. 1. In an alternative design, the pair of differential sensors 51 and 52 may be modified in such a way that they detect the differential value between two fluid pressures commonly existing in one of the pair of conduits 45 and 46 in the same manner shown and described in conjunction with FIG. 1.

Figure 8:
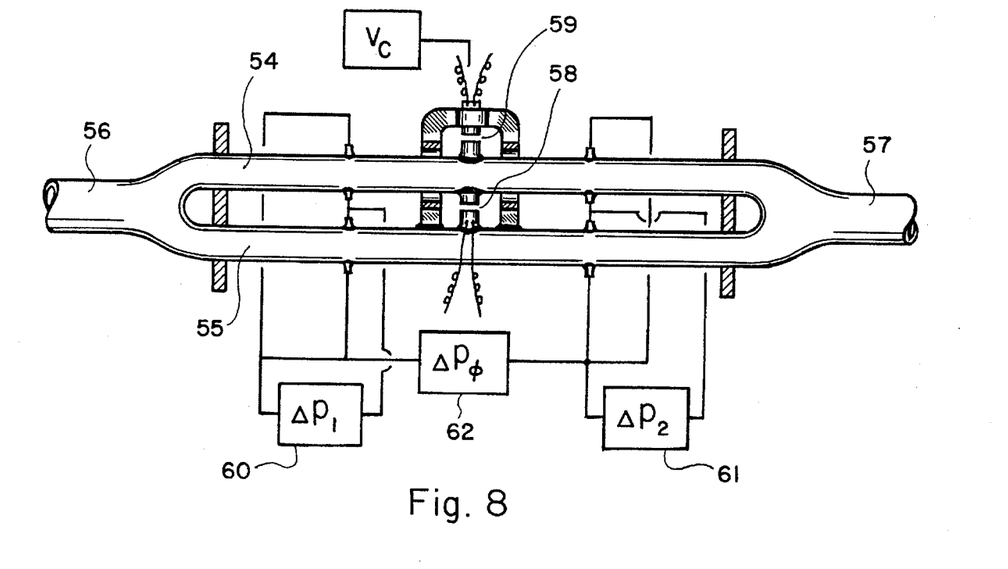
FIG. 8 illustrates still another embodiment of the inertia force flowmeter comprising a pair of straight conduits.

In FIG. 8 there is illustrated still another embodiment of the inertia force flowmeter, that is a dual conduit counterpart of the single conduit version of the inertia force flowmeter shown in FIG. 2 or 3. A pair of parallel conduits 54 and 55 connecting a common inlet leg 56 to a common outlet leg 57 are flexurally vibrated relative to one another by a vibrator 58. A relative vibration sensor 59 detects the velocity of the relative flexural vibration between the pair of conduits 54 and 55 at the center section of the combination thereof. Each of a pair of differential pressure sensing systems 60 and 61 detects mean value of the convective inertia forces experienced by the fluid media contained in the pair of conduits 54 and 55 at each of two different sections of the combination of the pair of conduits 54 and 55. In a combination employing the pair of differential pressure sensing systems 60 and 61, and the motion sensor 59, the particular illustrative embodiment of the inertia force flowmeter works on the same principles as those described in conjunction with FIGS. 1 and 2. In place of the pair of differential sensing systems 60 and 61, a single differential pressure sinsing system 62 may be employed, wherein the single differential sensing system 62 detects a mean value of the difference in the convective inertia force experienced by fluid media between two different sections of each of the pair of conduits 54 and 55. In a combination employing the single differential pressure sensing system 62 and the motion sensor 59, the particular illustrative embodiment of the inertia force flowmeter works on the same principles as those described in conjunction with FIG. 3, wherein another differential pressure sensing system, such as the element 32 included in the embodiment shown in FIG. 3, may be included. It should be understood that the sensor systems employed by the inertia force flowmeter shown in FIG. 7 and the two different sensor systems employed by the inertia force flowmeter shown in FIG. 8 are interchangeable and, consequently, a dual conduit version of the inertia force flowmeter may employ any one of five different sensor systems respectively shown FIGS. 1, 3, 7 and 8.

Figure 9:
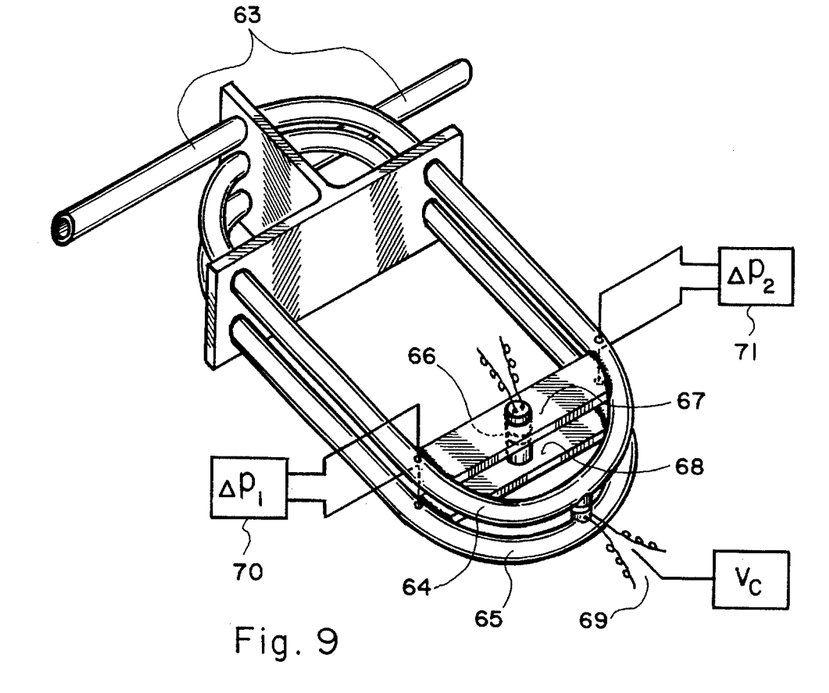
FIG. 9 illustrates still a further embodiment of the inertia force flowmeter comprising a single conduit with double loops.

In FIG. 9 there is illustrated still a further embodiment of the inertia force flowmeter of the present invention, wherein a single continuous conduit 63 includes a pair of 360 degree loops 64 and 65 superimposed to one another with a space therebetween. An electromagnetic vibrator 66 with action and reaction halves respectively anchored to two bracing members 67 and 68 respectively affixed to the pair of conduit loops 64 and 65 generates a relative flexural vibration between the pair of conduit loops 64 and 65. The particular illustrative embodiment of the inertia force flowmeter comprises the same combinations of the sensor systems as that of the embodiment shown in FIG. 7, which sensor system comprises a relative motion sensor 69 and a pair of differential pressure sensors 70 and 71 assigned to two different sections of the combination of the pair of conduit loops 64 and 65 located symmetrically about the center plane of the conduit. Of course, the particular sensor system may be replaced with one of the two sensor system described in conjunction with FIG. 8. It is readily noticed that the pair of differential pressure sensors employed in the embodiments shown in FIGS. 7, 8 and 9 can be replaced with a pair of relative motion sensors such as the magnetic induction coil type comprising a permanent magnet and an induction coil respectively affixed to the pair of conduits or to the pair of conduit loops under the relative vibration therebetween.

While the principles of the present inventions have now been made clear by the illustrative embodiments shown and described, there will be many modifications of the structures, arrangements, proportions, elements and materials, which are immediately obvious to those skilled in the art and particularly adapted to the specific working environments and operating conditions in the practice of the inventions without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the inventions, in which an exclusive property or privilege is claimed, are defined as follows:

1. An apparatus for measuring flow rate of fluid media moving through at least one flow passage under a lateral reciprocating motion, comprising in combination:
   a) at least one flow passage;
   b) means for generating a lateral reciprocating motion of the flow passage in directions substantially perpendicular to a reference plane defined by the center line of the flow passage in a mode wherein amplitude of the lateral reciprocating motion of the flow passage has a minimum value at two opposite extremities of the flow passage and has a maximum value at a center section of the flow passage;
   c) a first differential pressure transducer converting a difference between two fluid pressures respectively tapped from fluid media located on two opposite sides of the reference plane at a first section of the flow passage, to a first alternating electrical signal; and a second differential pressure transducer converting a difference between two fluid pressures respectively tapped from fluid media located on two opposite sides of the reference plane at a second section of the flow passage, to a second alternating electrical signal; and
   d) means for determining a difference between the first and second alternating electrical signals as a measure of flow rate of fluid media moving through the flow passage.

2. An apparatus as defined in claim 1 wherein said means for determining a difference between the first and second alternating electrical signals determines an electrical parameter related to a phase angle difference between the first and second alternating electrical signals, and said combination includes means for determining flow rate of fluid media from a product of a coefficient and a function of said electrical parameters.

3. An apparatus as defined in claim 2 wherein said combination includes means for detecting an amplitude of fluctuation in difference between two fluid pressures respectively tapped from fluid media located on two opposite sides of the reference plane at a section of the flow passage as a mechanical parameter related to said coefficient, and said means for determining flow rate determines mass flow rate of fluid media from a product of said amplitude of fluctuation in difference between two fluid pressures and the function of said electrical parameter.

4. An apparatus as defined in claim 3 wherein said combination includes means for detecting an amplitude of velocity of the lateral reciprocating motion of the flow passage, and said means for determining flow rate determines mass flow rate of fluid media from a product of a ratio of said amplitude of fluctuation in difference between two fluid pressures to said amplitude of velocity and the function of said electrical parameter.

5. An apparatus as defined in claim 2 wherein said combination includes means for detecting an amplitude of velocity of the lateral reciprocating motion of the flow passage as a mechanical parameter related to said coefficient, and said means for determining flow rate determines mass flow rate of fluid media from a ratio of the function of said electrical parameter to square of said amplitude of velocity.

6. An apparatus as defined in claim 2 wherein said combination includes means for detecting frequency of the lateral reciprocating motion of the flow passage as a mechanical parameter related to said coefficient, and said means for determining flow rate determines volume flow rate of fluid media from a product of a power function of said frequency and the function of said electrical parameter.

7. An apparatus as defined in claim 6 wherein said combination includes means for detecting an amplitude of velocity of the lateral reciprocating motion of the flow passage, and said means for determining flow rate determines volume flow rate from a product of a ratio of the power function of said frequency to said amplitude of velocity and the function of said electrical parameter.

8. An apparatus as defined in claim 1 wherein said combination includes another flow passage disposed in a parallel relationship to said a flow passage, wherein said another flow passage has a configuration substantially identical to configuration of said a flow passage and is disposed next to said a flow passage in a superimposing relationship with a space therebetween, and said means for generating the lateral reciprocating motion generates a relative lateral reciprocating motion between said a and another flow passage.

9. An apparatus as defined in claim 8 wherein said means for determining a difference between the first and second alternating electrical signals determines an electrical parameter related to a phase angle difference between the first and second alternating electrical signals, and said combination includes means for determining flow rate of fluid media from a product of a coefficient and a function of said electrical parameter.

10. A method for measuring mass flow rate of media moving through at least one conduit with two extremities restrained from experiencing lateral displacement, comprising in combination:
    a) generating a lateral reciprocating motion of said at least one conduit in directions substantially perpendicular to a reference plane defined by the center line of the conduit in a mode wherein amplitude of the lateral reciprocating motion of the conduit has a minimum value at two opposite extremities of the conduit and has a maximum value at a center section of the conduit;
    b) generating two alternating electrical signals respectively representing two alternating pressure gradients existing within the media in directions substantially perpendicular to the reference plane at two different sections of the conduit by using two differential pressure transducers respectively tapping pressure at the two different sections of the conduit; and
    c) determining a difference between the two alternating electrical signals as a measure of mass flow rate of the media moving through the conduit.

11. A method as defined in claim 10 wherein the mass flow rate of the media moving through the conduit is determined as a function of the difference between the two alternating electrical signals.

12. A method as defined in claim 10 wherein the difference between the two alternating electrical signals is determined by measuring an electrical parameter related to a phase angle difference between the two alternating electrical signals.

13. A method as defined in claim 12 wherein an amplitude of alternating pressure gradient existing within the media in directions substantially perpendicular to the reference plane is measured at a section of the conduit, and the mass flow rate is determined as a function of the product of said amplitude of alternating pressure gradient and said electrical parameter related to the angle difference.

14. A method as defined in claim 12 wherein an amplitude of the lateral reciprocating motion of the conduit is measured at a section of the conduit, and the mass flow rate is determined as a function of combination of said amplitude of the reciprocating motion and said electrical parameter related to the phase angle difference.

15. A method as defined in claim 12 wherein an amplitude of the lateral reciprocating motion of the conduit is measured at a section of the conduit, and the mass flow rate is determined as a function of ratio between said amplitude of the reciprocating motion and said electrical parameter related to the phase angle difference.

16. A method as defined in claim 10 wherein the conduit has a curved configuration substantially disposed on the reference plane.

17. A method as defined in claim 10 wherein an electrical parameter related to a phase angle difference between the two alternating electrical signal is measured, and the mass flow rate of the media moving through the conduit is determined as a function of the electrical parameter related to the phase angle difference.

18. A method as defined in claim 10 wherein said at least one conduit is reciprocated laterally relative to another conduit having substantially identical configuration as the configuration of said at least one conduit and disposed next to said at least one conduit in an approximately parallel and superimposing relationship with a space therebetween, wherein said at least one conduit and said another conduit connect an inlet flow passage to an outlet flow passage in one of the series connection and the parallel connection.

19. A method as defined in claim 18 wherein an electrical parameter related to a phase angle difference between the two alternating electrical signals is measured, and the mass flow rate of the media moving through said at least one conduit and said another conduit is determined as a function of the electrical parameter related to the phase angle difference.

20. A method as defined in claim 18 wherein each of the two differential pressure transducers taps pressure of the media contained in said at least one conduit from a region adjacent to a portion of conduit wall located on one side of the reference plane and taps pressure of the media contained in said another conduit from a region adjacent to a portion of conduit wall located on one side of a plane defined by the center line of said another conduit, said one side of the plane defined by the center line of said another conduit being the same side as said one side defined in conjunction with the reference plane.

* * * * *